United States Patent [19]

Rahn et al.

[11] Patent Number: 4,962,506
[45] Date of Patent: Oct. 9, 1990

[54] SCATTER SYMMETRIZATION IN MULTI-MODE RING LASER GYROS

[75] Inventors: John P. Rahn, Canoga Park; David Hall, La Crescenta, both of Calif.

[73] Assignee: Litton Systems, Inc., Woodland Hills, Calif.

[21] Appl. No.: 181,490

[22] Filed: Apr. 14, 1988

[51] Int. Cl.$^5$ .............................. H01S 3/083
[52] U.S. Cl. .................... 372/94; 372/107; 350/356
[58] Field of Search ............ 372/94, 107; 378/93, 378/98; 356/350

[56] References Cited

U.S. PATENT DOCUMENTS

| | | | |
|---|---|---|---|
| 3,741,657 | 6/1973 | Andringa | 356/106 |
| 4,397,027 | 8/1983 | Zampiello et al. | 372/94 |
| 4,494,873 | 1/1985 | Perlmutter et al. | 372/94 |
| 4,519,708 | 5/1985 | Perlmutter et al. | 372/94 |
| 4,548,501 | 10/1985 | Smith et al. | 356/350 |
| 4,627,732 | 12/1986 | Braun et al. | 372/94 |
| 4,687,331 | 8/1987 | Holz et al. | 372/32 |

OTHER PUBLICATIONS

Chow, Weng W., "Multi-Oscillator Laser Gyros", *IEEE Journal of Quantum Electronics*, vol. QE—16, No. 9, Sep. 1980, pp. 918–936.

Greninger, Charles E., "Reflective Device for Polarization Rotation", *Applied Optics*, vol. 27, No. 4, Feb. 15, 1988, pp. 774–776.

Light Scattering from Multilayer Optics: Comparison of Theory and Experiment by J. M. Elson, J. P. Rahn and J. M. Bennett, vol. 19, No. 5, Applied Optics, Mar. 1, 1980, issue, pp. 669–679.

*Primary Examiner*—Léon Scott, Jr.
*Attorney, Agent, or Firm*—Poms, Smith, Lande & Rose

[57] ABSTRACT

Disclosed herein is a method and apparatus for achieving scatter symmetrization in a multi-mode non-planar ring laser gyro. The retro scatter effect which results in scatter coupling in each of the left and right circular polarized sets of beams is equalized, so that the scatter coupling may be common-mode rejected during the analysis phase of the ring laser gyro operation. This equalization is achieved by unique orientation of the mirrors and the non-reciprocal polarization rotator. The non-reciprocal rotator which may be a Faraday rotator, is rotated in such a manner that its angle of rotation relative to an angle fixed at the plane of incidence of one of the mirrors of the leg is proportional to the positioning of the rotator along the axis between the mirrors of this leg. In this manner equal scatter coupling will occur in the left and right circularly polarized light and this scatter coupling may be common-mode rejected for purposes of deriving accurate rotational information.

Scatter symmetrization is also achieved by configuring the mirrors in legs of equal length so the amount of image rotation attributed to each leg is proportional to the leg length.

12 Claims, 3 Drawing Sheets

SCATTER SYMMETRIZATION IN MULTI-MODE RING LASER GYROS

FIELD OF THE INVENTION

This invention relates to ring laser gyros and, in particular, to multi-mode non-planar ring laser gyros.

BACKGROUND OF THE INVENTION

Ring laser gyros have been developed to provide an alternate form of rotational measurement to the mechanical gyroscope by use of an all optical system. A basic two-mode ring laser gyroscope has two independent counter-rotating light beams oscillating in an optical ring cavity. The frequencies of the light beams depend on the rotation rate of the cavity with respect to inertial frame of reference. In this manner, the rotation rate is proportional to the beat note. Ideally, the ring laser gyro contains no moving parts. In practice, however, the two-mode laser gyro often must be mechanically dithered to keep the counter-rotating traveling waves from locking at low rotation rates.

To improve on this design and avoid the need for a dither, non-planar gyros have been invented. As an alternative to the use of dithering, investigations have shown that the "lock-in" problem can be eliminated by using a ring cavity that contains more than one pair of counter rotating modes. The operation of a basic four-frequency laser gyroscope is described in U.S. Pat. No. 3,741,657 issued June 26, 1973, to K. Andringa. In such four-frequency laser gyroscope systems, beams of four distinct frequencies propagate around a closed propagation path defined by three or more mirrors. Two of these beams circulate around the closed propagation path in a clockwise direction while the other two circulate in the anti-clockwise direction. One of the clockwise beams and one of the anti-clockwise beams are of a first polarization sense, while the other one of the clockwise and the other one of the anti-clockwise beams are of another polarization sense. For example, the first clockwise beam and the first anticlockwise beam may be of right circular polarization while the second clockwise and the second anticlockwise beams may be of a left hand circular polarization. The two right hand circular polarized beams may be of the highest two frequencies while the left hand circular polarized beams may be of the lowest two frequencies.

Rotation of the multi-mode laser gyroscope about its central axis causes the two right hand circular polarized beams to move further apart in frequency than at rest state while the two left hand circular polarized beams become closer together in frequency. Opposite frequency shifts occur for opposite direction of rotation. The difference between frequency shifts in the right hand circular polarized beam and the left hand circular polarized beam is in direct proportion to the rate of rotation of the system. The time integral of this difference is directly proportional to the total amount of rotation about the sensitive axis.

In the system described in the Andringa '657 Patent, a quartz crystal rotator provides the necessary optical activity to cause a split between the average of the frequency of the right and left hand circularly polarized beams. The split accomplished by this crystal provides a phase delay for circular polarized waves that is different for one sense of circular polarization than for the opposite sense and is a reciprocal split. In addition to an element for reciprocal splitting, a planar multi-mode oscillator ring laser gyro may also have a Faraday rotator which provides frequency split between the sets frequencies of clockwise and anticlock wise beams of both left and right polarization. The Faraday rotator is a non-reciprocal device providing different phase delay for waves of the same polarization states propagating in opposite directions.

Among the multi-mode ring laser gyros, a non-planar configuration comprising at least four mirrors and a non-reciprocal rotator is described in Smith, U.S. Pat. No. 4,548,501, issued Oct. 22, 1985. In a non-planar configuration, reciprocal rotation is accomplished by the non-planar geometry of the multi-mode ring laser gyro. The out-of-planeness geometry in a folded rhombus ring laser gyro, provides the necessary reciprocal splitting into left and right circular polarized beams. However, the clockwise and anticlockwise component of each circularly polarized beam are essentially locked, even if the mirror surfaces were perfect. In order to further split the right and left circular beams into their clockwise-anticlockwise frequency components, a non-reciprocal rotator means, such as a Faraday Rotator is used. The left and right circularly polarized sets of beams are widely separated in frequency. In this manner a multi-mode ring laser gyro avoids the problem of mode lock in common to a two-mode ring laser gyro.

However, a phenomenon known as "scatter coupling" still occurs between the clockwise and anti-clockwise members of each set of frequencies of the right and left handed circularly polarized beams. The Faraday rotator splits the clockwise and anticlockwise components of the left and right circularly polarized beams apart in frequency. In a multi-mode setting, typically, there are two lower frequency left circularly polarized clockwise and anticlockwise modes and two higher frequency, right circularly polarized clockwise and anticlockwise modes.

Typically, the counter-rotating modes of left and right circularly polarized beams are separated by about 1 MHz, while about 100 to 1,000 MHz separates left and right polarization. Unlike a planar two-mode ring laser gyro, where "lock-in" characteristics improve with the rate of rotation of the ring laser gyro, in the folded rhombus multi-mode gyro, as the speed of rotation of the ring laser gyro increases, the clockwise and anticlockwise components in a multi-mode ring laser gyro move towards a locking condition. To the extent separation of a clockwise and anticlockwise components is possible, the Faraday rotator provides non-reciprocal splitting in order to establish four separate modes of propagation.

All 4 mirrors and the Faraday rotator scatter some of the incident beams back into the oppositely propagating beams. This is called retroscatter and causes coupling between the beams which generally leads to rotation measurement errors.

As used in this application, the term "retroscatter" refers the phenomenon of light scatter as it occurs between counter propagating beams of the right and left set of beams as these beams are directly incident upon the surface of a mirror or a Faraday rotator. Upon reaching a mirror, a left circularly polarized beam (LCP) is reflected primarily off the surface of the mirror with a shift of helicity from right circularly polarized (RCP) to left circularly polarization in the next leg. Not all the light falling upon a mirror of the ring laser gyro is reflected, some of the light energy and photons are retro-scattered onto the counter-propagating light beam of the same polarity. The anti-clockwise left circular ring laser gyro beam, for example, retro-scatters onto the clockwise ring laser gyro beam and vice versa. In this manner each of the counter-propagating beams have a retro-scatter effect on one another and the phenomenon as a whole is known as "scatter coupling." Although not necessarily as severe a problem as frequency lock in a two-mode laser gyroscope, the scatter coupling effect can hurt the accuracy and precision of a non-planar ring laser gyro. This application seeks to address the problem of scatter coupling.

In a non-planar multi-mode ring laser gyro, there are at least six sites at which scatter coupling may occur between clockwise and anticlockwise components. These sites include each of the four mirrors (four mirrors being the minimum required to achieve a non-planar gyro) and the front and exit surfaces of the non-reciprocal Faraday rotator.

SUMMARY OF THE INVENTION

Rather than reducing or eliminating the problems (the way "lock-in" has been addressed in a two frequency planar laser gyro), this application provides a method and apparatus for compensating for the "scatter coupling" effect through application of the technique of scatter symmetrization. This invention is directed to an apparatus and method for ascertaining the scatter coupling that arises in both the left and right sets of circularly polarized beams and equalizing the scatter coupling that occurs in each set of beams. When signal processing of the left and right circularly polarized beams is undertaken by the laser detector, by taking the difference of the frequencies, the rotational information output will be unaffected by the phenomenon scatter coupling because the phenomenon has been equalized in both left and right circularly polarized sets of beams by application of scatter symmetrization.

The heart of the invention is a method and apparatus for dealing with scatter coupling. According to the Applicant's invention, no attempt is made to eliminate scatter coupling. Scatter coupling is a result of the imperfect nature of the mirrors. However, since all measurement is really a form of common mode rejection, the applicant subtracts the differences out. If one can equalize the scattering of the LCP and RCP mode pairs, the overall scatter coupling of the RCP mode pair would be the same as the overall scatter coupling of the LCP mode pair. Then, when left and right circularly polarized frequency splittings are compared to each other, to obtain rotation rates, the scatter effects will be common mode rejected. Then scatter really will not play a role in rotational measurement.

In one embodiment of a folded rhombus non-planar multi-oscillator ring laser gyro, where all four legs are of equal length, scatter symmetrization is automatically achieved for all four mirrors by virtue of the equal leg lengths, since scatter symmetrization results where the legs of the gyro (the distances between the mirrors of a ring laser gyro) are proportional to the amount of image rotation in each leg. Further, scatter symmetrization of the Faraday rotator is achieved by orienting the non-reciprocal rotator in the following manner. The Faraday rotator is positioned along one leg of the ring laser gyro between a first and second mirror. A bi-normal vector which is perpendicular to the plane of incidence is associated with each of the two mirrors and the Faraday rotator. For ease of conceptualization we can project all 3 of these bi-normal vectors onto a plane perpendicular to the line between the 2 mirrors. Then let the angle between bi-normals of the mirrors be $\theta_{12}$ the angle between the bi-normal of the rotator and the first mirror be of $\theta_{1F}$. Let the distance between the mirrors be $L_{12}$. Then the distance from mirror 1 to the rotator must be a function of these angles and the distance between the first and second mirrors.

For example, if the rotator were midway between the two mirrors, then the bi-normal of the rotator bisects the angle formed by the bi-normals of the two adjacent mirrors.

In summary an apparatus which achieves scatter symmetrization is a ring laser gyro cavity having an active region acting as a source of bi-directional coherent light, the light providing at least four modes of cavity propagating waves. The laser gyro cavity has at least four optically reflective elements and at least two of these elements form one of four equal legs of the gyro cavity. The equal legs establish equality between the total left circularly polarized scatter from the mirrors and the total right circularly polarized scatter from the mirrors. A non-reciprocal optical polarization rotator means is positioned between the reflective elements that form a leg. The non-reciprocal means is rotated with respect to a bi-normal axis of one of the reflective elements forming the leg and a second bi-normal axis of one of the reflective elements forming the leg, in such a manner that the amount of rotation imparted to the non-reciprocal rotator means is a function of the positioning of the rotator along a line connecting the reflective elements of this leg. A method for achieving scatter symmetrization within a multi-oscillator ring laser gyro would include:

positioning the reflective elements of the ring laser gyro in a non-planar configuration such that all reflective element distances are equal;

positioning a non-reciprocal optical polarization rotation means along one of said legs of the ring laser gyro; and, rotating bi-normal axis of said non-reciprocal optical polarization rotator means with respect to a bi-normal axis of one of the reflective elements forming the leg and a second bi-normal axis of the other of said reflective elements forming this leg, in such a manner that the amount of rotation imparted to said non-reciprocal rotator means is a function of positioning the non-reciprocal rotator along a line connecting the reflective elements of the leg.

DETAILED DESCRIPTION OF THE PREFERRED EMBODIMENT

Figure 1:
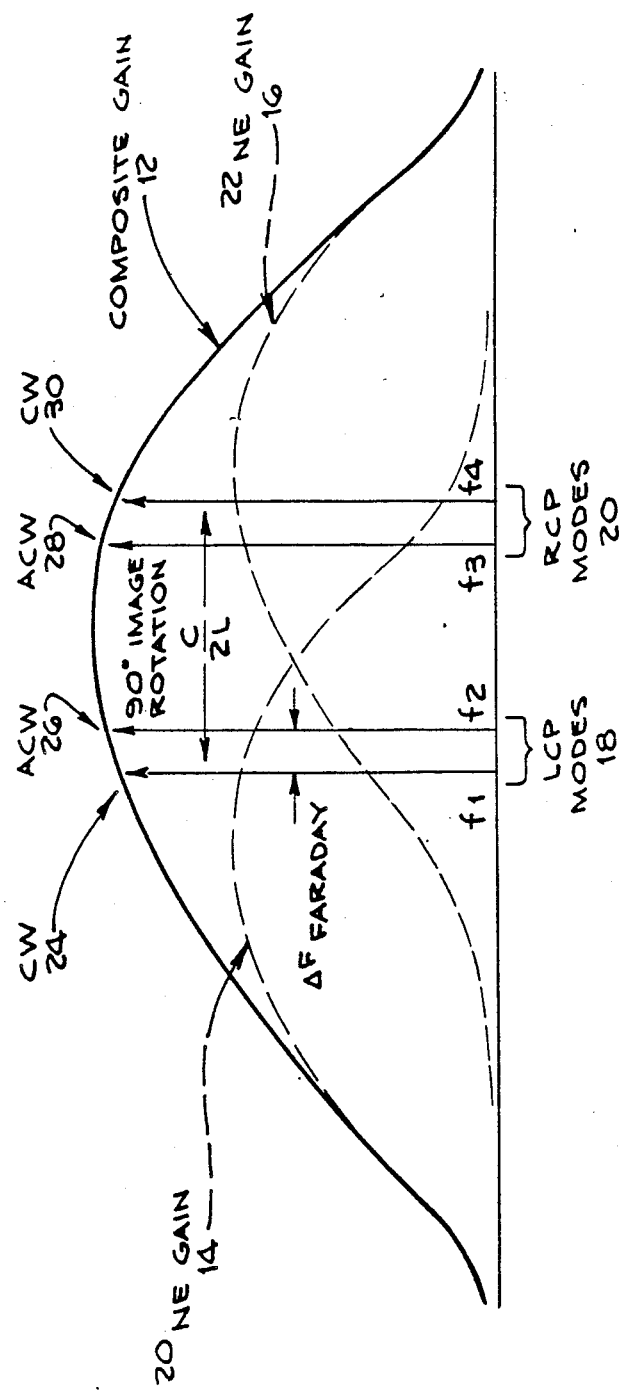
FIG. 1 is prior art diagrammatic view of the frequency spectrum of a multi-mode ring laser gyro shown as a graph of gain against frequency.

With reference to FIG. 1, the frequency spectrum of a multi-mode ring laser gyro is shown as a graph of gain (in the vertical direction) against frequency in the horizontal direction. The gain is a composite 12 formed by a medium made from $^{20}$Ne gain (14) and $^{22}$Ne gain (16). The resulting mix is provided as composite gain 12. Four separate frequency modes, $f_1$, $f_2$, $f_3$ and $f_4$ are shown. The left circularly polarized modes 18 are $f_1$ and $f_2$. The right circular polarized modes 20 are $f_3$ and $f_4$. You will note that $f_2$ and $f_3$ are separated by a wide frequency range 22, somewhere in the range of 100 megahertz to 1 GHz (gigahertz). Each set of left 18 and right 20 circularly polarized modes are in turn made of one clockwise and one anti-clockwise mode. In order to prevent locking between the counter-propagating modes, a non-reciprocal polarizing means such as a Faraday Rotator is used to separate clockwise and anti-clockwise modes within each of the sets 18 and 20. The left circularly polarized clockwise mode 24 is separated from left circularly polarized anticlockwise mode 26 by about 1 megahertz. This same frequency also separates anticlockwise mode 28 and clockwise mode 30 of the right circularly polarized mode 20 in the typical non-planar ring laser gyro.

Figure 2:
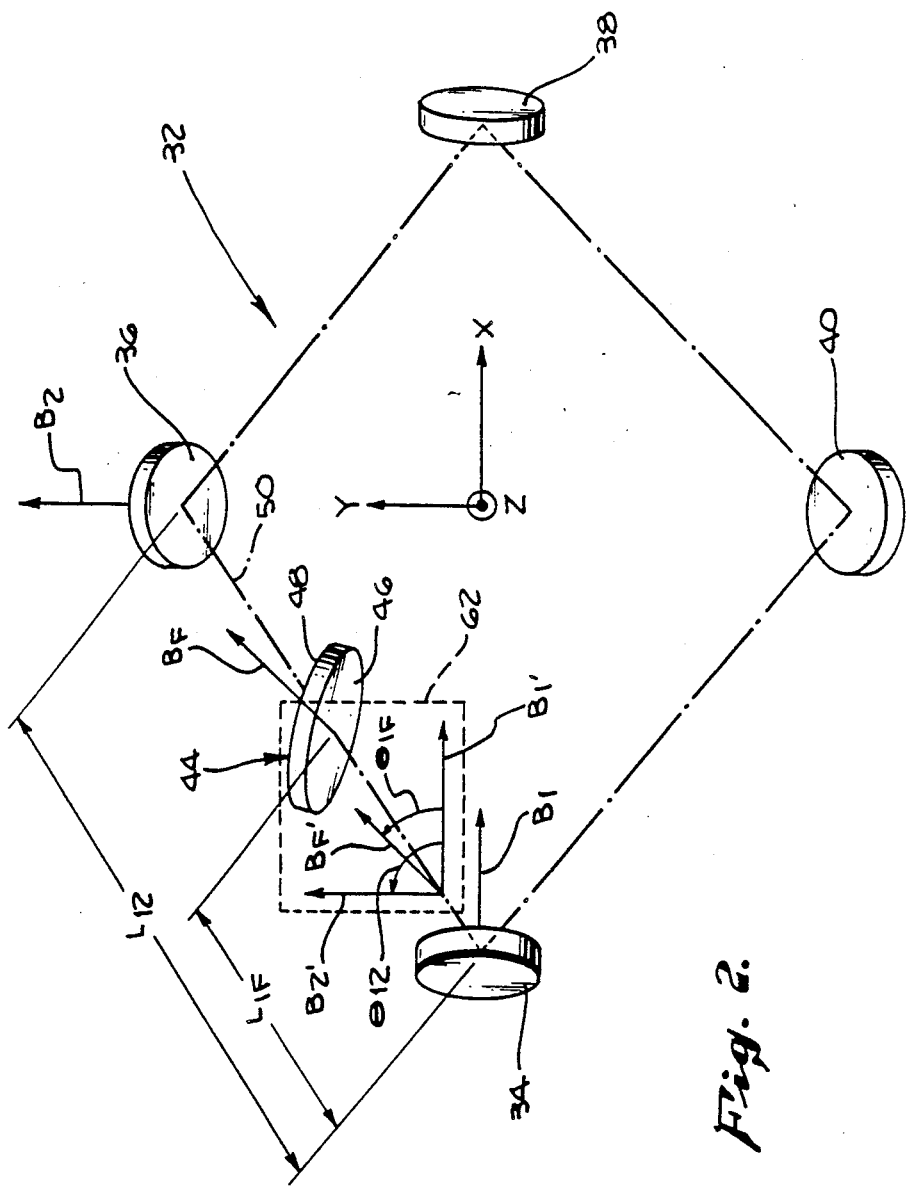
FIG. 2 is a perspective view the diagrammatically constructed folding rhombus multi-mode ring laser gyro.

Turning to FIG. 2 a perspective view of a folding rhombus multi-mode ring laser gyro of the present invention having four mirrors and a Faraday Rotator is shown generally 32. Mirrors 34, 36, 38 and 40 are positioned at each of the corners of the folded rhombus ring laser gyro 32. (The multi-mode non-planar ring laser gyro 32 in this particular configuration is known as a "folded rhombus" because the gyro 32 is constructed by folding a planar 4 mirror gyro, comprising mirrors 34, 36, 38 and 40, upward along a fold line formed between mirrors 34 and 38, for example. A Faraday Rotator 44 may be positioned between mirrors 34 and 36. It should be noted that there is no preferred leg in which the Faraday Rotator 44 is to be positioned. Rather, this non-reciprocal rotator may be positioned in one of the four equal legs of the non-planar ring laser gyros shown.

There are six different sites where scatter coupling arises between modes $f_1$ and $f_2$ and between modes $f_3$ and $f_4$ of FIG. 1. These scatter coupling sites include the point of incidence in the ring laser gyro cavity on each of the four mirrors 34, 36, 38 and 40. Also included as sites of scatter coupling are the forward and rearward surfaces 46 and 48, respectively, of the disc-shaped Faraday Rotator 44. For purposes of illustration, a line 50 joins the points of incidence of mirrors 34 and 36. It has been found through theoretical calculations, backed up by computer simulations that scatter coupling may be equalized at each of the surfaces of the mirrors; so that the left and right scatter coupling may be common mode rejected at the time that final calculations of the rate of rotation are made.

Vectors $B_1$ and $B_2$ are bi-normal vectors to the surfaces of mirrors 34 and 36, respectively. A "bi-normal vector" is normal to the plane of incidence of the mirror. For example, if one mirror has the reference bi-normal vector, it may be referred to as zero degrees, and the bi-normal vector of the other mirror may be 60 degrees difference. If the Faraday rotator is midway between the two mirrors of the leg, it should be set at 30 degrees, and it would achieve scatter symmetrization. Conceive a plane 62 perpendicular to line 50. Then translate bi-normal vectors $B_1$ of mirror 34 as $B_1'$, $B_2$ of mirror 36 as $B_2'$, and $B_F$ of the rotator as $B_F'$ onto this plane. $\theta_{12}$ is defined by the angle made between bi-normal $B_1'$ and the bi-normal $B_2'$. $B_F'$ is a bi-normal vector translated from the surface 46 of the Faraday Rotator to plane 62 and defines an angle $\theta_{1F}$.

It has been determined by the applicants that if one were to orient the angle $\theta_{1F}$ in accordance with the following equation, scatter symmetrization would be achieved:

$\theta_{1F}/\theta_{12} = L_{1F}/L_{12}$, $\theta_{1F}$ is between $B_1'$ and $B_F'$;

$\theta_{12}$ is between $B_1'$ and $B_2'$;

$L_{1F}$ is the distance between the surface of the Faraday Rotator 44 and mirror 34; and, $L_{12}$ is the distance between mirrors 34 and 36.

Where the Faraday Rotator 44 is midway between mirrors 34 and 36, then the setting of $\theta_{1F}$ should be an angle exactly halfway between $B_1'$ and $B_2'$; since, $\theta_{1F}/\theta_{12} = \frac{1}{2}$.

An experimental model of one example of the apparatus and method previously described follows. If one chose a coordinate system so that the sensitive axis of the multi-mode ring laser gyro is along the z direction (this is normal to the page in FIG. 2), then if the mirror normal tip angles out of the xy plane are both $\theta$ (as they will be when we have equal fold angles), we can trivially write the mirror 34 and 36 bi-normal unit vectors at mirrors 34 and 36 as:

$$\hat{b}_2 = \hat{y}\sin(\theta) + \hat{z}\cos(\theta) \text{ (mirror 34)} \qquad (1a)$$

$$\hat{b}_1 = \hat{x}\sin(\theta) + \hat{z}\cos(\theta) \text{ (mirror 36)} \qquad (1b)$$

The unit ray vector, $\hat{k}_{12}$ mirrors 34 and 36 is defined by the cross product of $\hat{b}_2$ with $\hat{b}_1$ since both must be normal to the ray vector. Thus $$\hat{k}_{12} = \frac{\hat{b}_2 \times \hat{b}_1}{|\hat{b}_2 \times \hat{b}_1|}$$

or after taking the cross product:

$$\hat{k}_{12} = \frac{(\hat{x} + \hat{y})\cos(\theta) - \hat{z}\sin(\theta)}{\sqrt{\cos^2(\theta) + 1}} \qquad (2)$$

The bi-normal of the Faraday rotator 44, $\hat{b}_F$, when the rotator is placed midway between mirrors 34 and 36, must be the bisector of $\hat{b}_2$ and $\hat{b}_1$. This means $$\hat{b}_F \cdot \hat{b}_2 = \hat{b}_F \cdot \hat{b}_1. \qquad (3)$$

Also $\hat{b}_F$ must be perpendicular to $\hat{k}_{12}$ so that $$\hat{b}_F \cdot \hat{k}_{12} = 0 \qquad (4)$$

Equations (3) and (4) are sufficient to define two of the xyz components of $\hat{b}_F$ in terms of the other one. To define these let $$\hat{b}_F = b_{Fx}\hat{x} + b_{Fy}\hat{y} + b_{Fz}\hat{z} \qquad (5)$$

Equations (1) and (3) give $$b_{Fy}\sin(\theta) + b_{Fz}\cos(\theta) = b_{Fx}\sin(\theta) + b_{Fz}\cos(\theta) \qquad (6)$$

Equations (2) and (4) give $$(b_{Fx} + b_{Fy})\cos(\theta) - b_{Fz}\sin(\theta) = 0 \qquad (7)$$

From equation (6) we have $$b_{Fy} = b_{Fx} \qquad (8)$$

and then equation (7) gives $$b_{Fz} = \frac{2b_{Fx}\cos(\theta)}{\sin(\theta)} \quad (9)$$

Then using the condition that the magnitude of a unit vector is 1

$$\sqrt{b_{Fx}^2 + b_{Fy}^2 + b_{Fz}^2} = 1 \quad (10)$$

so we have using equations (8), (9) and (10):

$$b_{Fx}\sqrt{1 + 1 + 4\cot^2(\theta)} = 1 \quad (11)$$

or solving for $b_{Fx}$ we have $$b_{Fx} = \frac{1}{\sqrt{2 + 4\cot^2(\theta)}} \quad (12)$$

so that using equations (8), (9) and (12) we have $$b_F = \frac{\hat{x} + \hat{y} + 2\hat{z}\cot(\theta)}{\sqrt{2 + 4\cot^2(\theta)}}$$

Thus in FIG. 2 where $\hat{z}$ is normal to the page, the projection of $\hat{b}_F$ must be shown as along the $\hat{x}+\hat{y}$ direction as it is. The foregoing vector algebra completely defines the scatter symmetrized bi-normal of a Faraday rotator 44 which is centered between mirrors 34 and 36 of an MOLG with equal fold angles.

Figure 3:
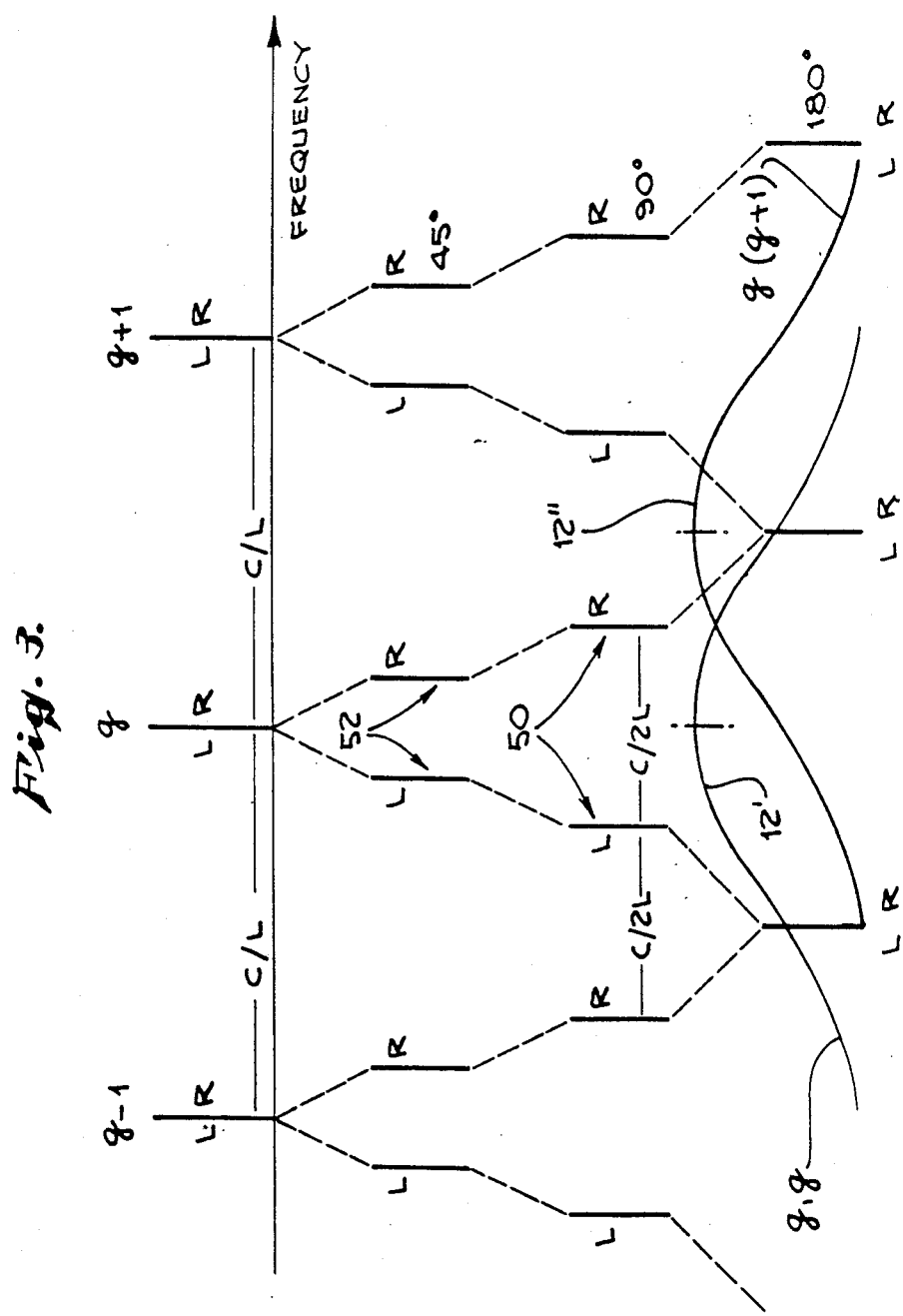
FIG. 3 shows a graph of alternate modes of operation of the multi-mode ring laser gyro to achieve scatter symmetrization with respect to degrees of image rotation.

FIG. 3 illustrates the mode conditions where scatter symmetrization can occur. FIG. 3 is a mode frequency diagram. It shows three parent longitudinal modes q−1, q, and q+1 characteristic of the planar gyro. The integers q−1, q, and q+1 are called the longitudinal mode numbers and they represent the number of optical cycles of spatial light modulation in the total length of the cavity. As non-planarity is increased, as depicted in the vertical downward direction, the parent modes split into an L branch and an R branch, the splitting being proportional to the image rotation. In the parent mode (q), image rotations of 45°, 90° and 180° are shown; longitudinal modes of (q−1) and (q+1), which make up the lasing phases, are also shown. Scatter symmetrization exists in the (q, q) lasing phase but cannot be obtained for the ((q+1), q) lasing phase. As the left and right circularly polarized sets of light beams traverse the total path of the non-planar ring laser gyro 32 of FIG. 2, a parent mode q is defined for each of the four frequencies as the number of full cycles which traverse the length of the ring laser gyro cavity. Where the ring laser gyro is completely planar, one may think of this gyro as equivalent to a non-planar gyro having an image rotation of 0° such that left and right circularly polarized frequency branches are degenerate and come together. It is only when the ring laser gyro is folded, say to 45° or 90°, that the degeneracy is removed so that the right and left sets circularly polarized light are separated, as shown at (50) (90° image rotation) and (52) 45° image rotation. At 180°, for example, the right circularly polarized frequency of the (q−1) lasing phase and the left circular polarized frequency of the q lasing phase merge as the same frequency. If one were to plot the gain curve of FIG. 1 such that the q, q lasing phase would oscillate optimally it would be superimposed as shown at 12'. Likewise, the gain curve of the q, (q+1) lasing phase is shown at 12''.

An important aspect of this invention is not only the proper orientation of a Faraday rotator in a ring laser gyro, but the application of that rotation in the proper mode setting as shown in FIG. 3. Adjacent modes, such as (q−1), q, and (q+1) are separated in the planar (0° degenerate) configuration by a frequency equal to $c/2L$, where c is the speed of light and L is the entire length of the ring laser gyro cavity. At a 90° image rotation, as shown in FIG. 2, the frequency difference between the left and right modes of the parent mode q is equal to $c/2L$, or ½ of the frequency difference between the q and (q+1) modes at 0° image rotation. This coincides with the separation shown on FIG. 1 between the left and right circular polarized modes and 20. It has been found that scatter symmetrization can only arise where the composite gain curve 12 (FIG. 1) is operating in a (q,q) lasing phase but not when the ring laser gyro operates in a q, (q+1) lasing phase such as 12''. This results because in a q (q+1) system, the left (q+1) and the right q sets of the system are of differing numbers of resonant wavelengths; i.e., left=(q+1), while right=q. Thus, the scatter cannot be symmetrized because the coupling in the left (q+1) set differs substantially from the coupling in the right (q) set. Left and right scatter couplings cannot be common mode rejected where they cannot be equalized.

It is to be understood that the application of the foregoing invention is primarily intended for non-planar multi-mode ring laser gyros (but the cavity does not have to be non-planar, since one can conceive of reciprocal rotation equal in all 4 legs such as a gas of helical molecules). Although other configurations and geometries not disclosed may be substituted, only those geometries which favor a proportionality between the distance travelled from scatter site to scatter site and image rotation support scatter symmetrization.

What is claimed is:

1. In a multi-oscillator ring laser gyro, an apparatus for achieving scatter symmetrization, comprising:
   a ring laser gyro cavity having an active region acting as a source of bi-directional coherent light, said light providing at least four modes of cavity propagating waves, two of said modes forming a right circularly polarized beam set, and two of said modes forming a left circularly polarized beam set;
   said laser gyro cavity having at least four optically reflective elements forming at least four legs of said cavity;
   at least two of said reflective elements forming one of said at least four legs of said gyro cavity;
   the reflective elements being oriented with respect to each other so that the amount of image rotation for each leg is proportional to the length of each leg;
   whereby, scatter symmetrization of the scatter coupled right and left circularly polarized sets of beams is achieved.

2. The multi-oscillator ring laser gyro, of claim 1, including:
   a non-reciprocal optical polarization rotator means positioned between the reflective elements that form one of said legs;
   said non-reciprocal rotator means being rotated with respect to a bi-normal axis of one of said reflective elements forming said leg and a second bi-normal axis of the other of said reflective elements forming said leg, where the amount of rotation imparted to said non-reciprocal rotator means is a function of positioning of said non-reciprocal rotator along a line connection said reflective elements of said leg;

whereby, scatter symmetrization of the scatter coupled right and left circularly polarized sets of beams is achieved.

3. The multi-oscillator ring laser gyro of claim 2 wherein the non-reciprocal optical polarization rotator means is a Faraday rotator.

4. The multi-oscillator ring laser gyro of claim 2 wherein the ring laser gyro operates in a q, q, mode.

5. The multi-oscillator ring laser gyro of claim 2 wherein the ring laser gyro is non-planar.

6. The multi-oscillator ring laser of claim 5, wherein the ring laser gyro is in a folded rhombus configuration, having legs or equal length.

7. The multi-oscillator ring laser gyro of claim 1 wherein the four optically reflective elements are planar mirrors and curved surface mirrors.

8. The multi-oscillator ring laser gyro of claim 1 wherein the four optically reflective elements are curved-surface mirrors.

9. A method of achieving scatter symmetrization in a multi-oscillator ring laser gyro, the steps of which comprise:

configuring at least four optically reflective elements in a folded pattern where the distance between each set of reflective elements form equal legs;

positioning a non-reciprocal optical polarization rotator means between a set of reflective elements that form one of said equal legs;

rotating said non-reciprocal optical polarization rotator means in such a manner that the angle that the bi-normal of said rotator means forms with a reference bi-normal of a first reflective means of said leg is proportional to the angle subtended by a second bi-normal of a second mirror reflective surface in both cases of said leg with said first bi-normal, where the amount of rotation imparted to the non-reciprocal rotator means is related to the relative positioning of the rotator along the line between the two reflective elements which form said leg;

whereby scatter symmetrization is achieved.

10. The method of claim 9, where the non-reciprocal optical polarization rotator means is a Faraday rotator.

11. The method of claim 9, wherein, the folded pattern is a rhombus.

12. A method of achieving scatter symmetrization in a multi-oscillator ring laser gyro, the steps of which comprise:

configuring at least four optically reflective elements in a folded pattern where the distance between each set of reflective elements is proportional to the amount of image rotation attributable to each leg formed by each set of reflective elements.

* * * * *